Oct. 6, 1953     B. F. MIESSNER     2,654,810
PHOTOELECTRIC TRANSLATING SYSTEM
Filed Nov. 15, 1949     2 Sheets-Sheet 1
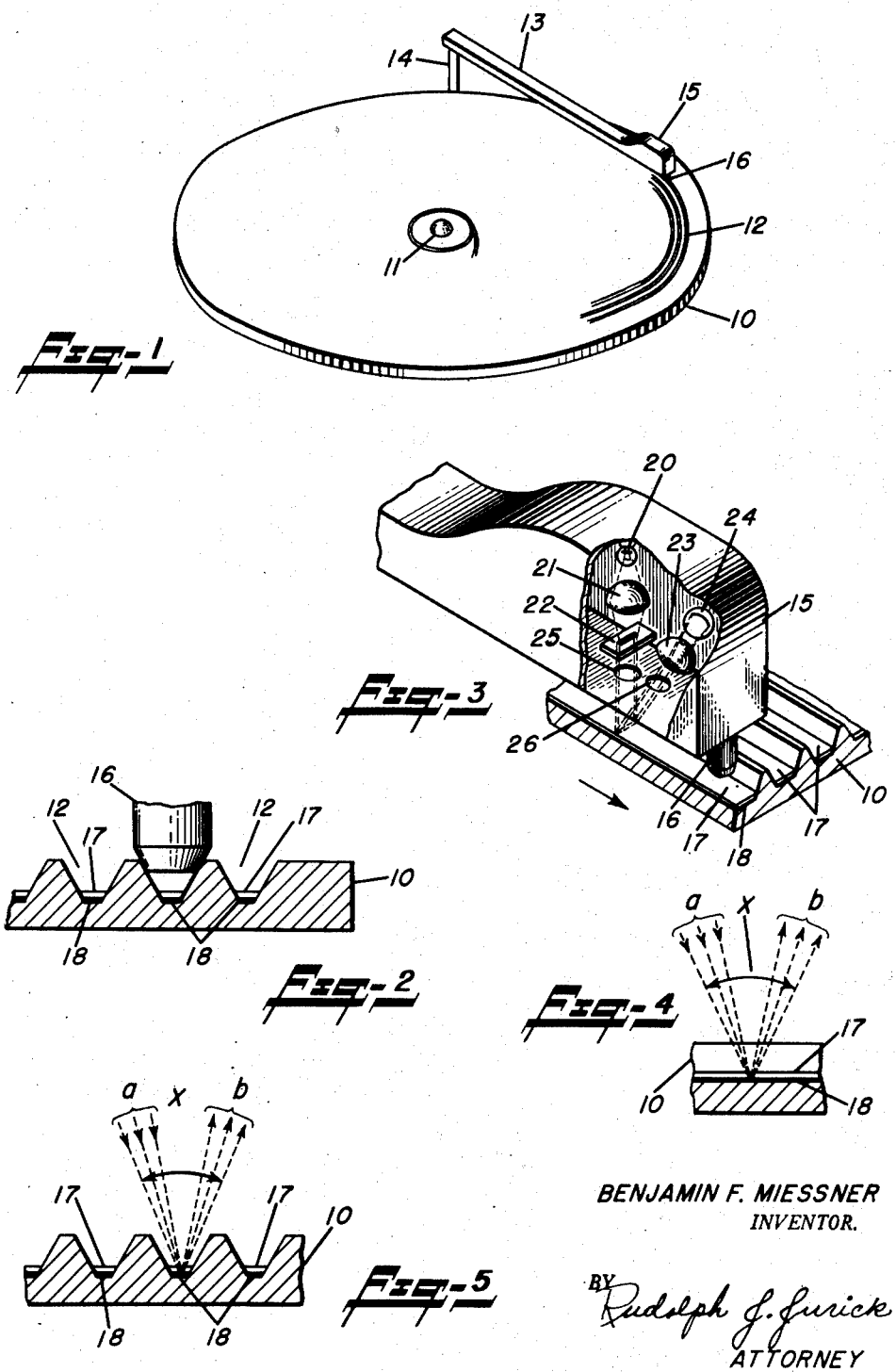
BENJAMIN F. MIESSNER
INVENTOR.
BY Rudolph J. Jurick
ATTORNEY

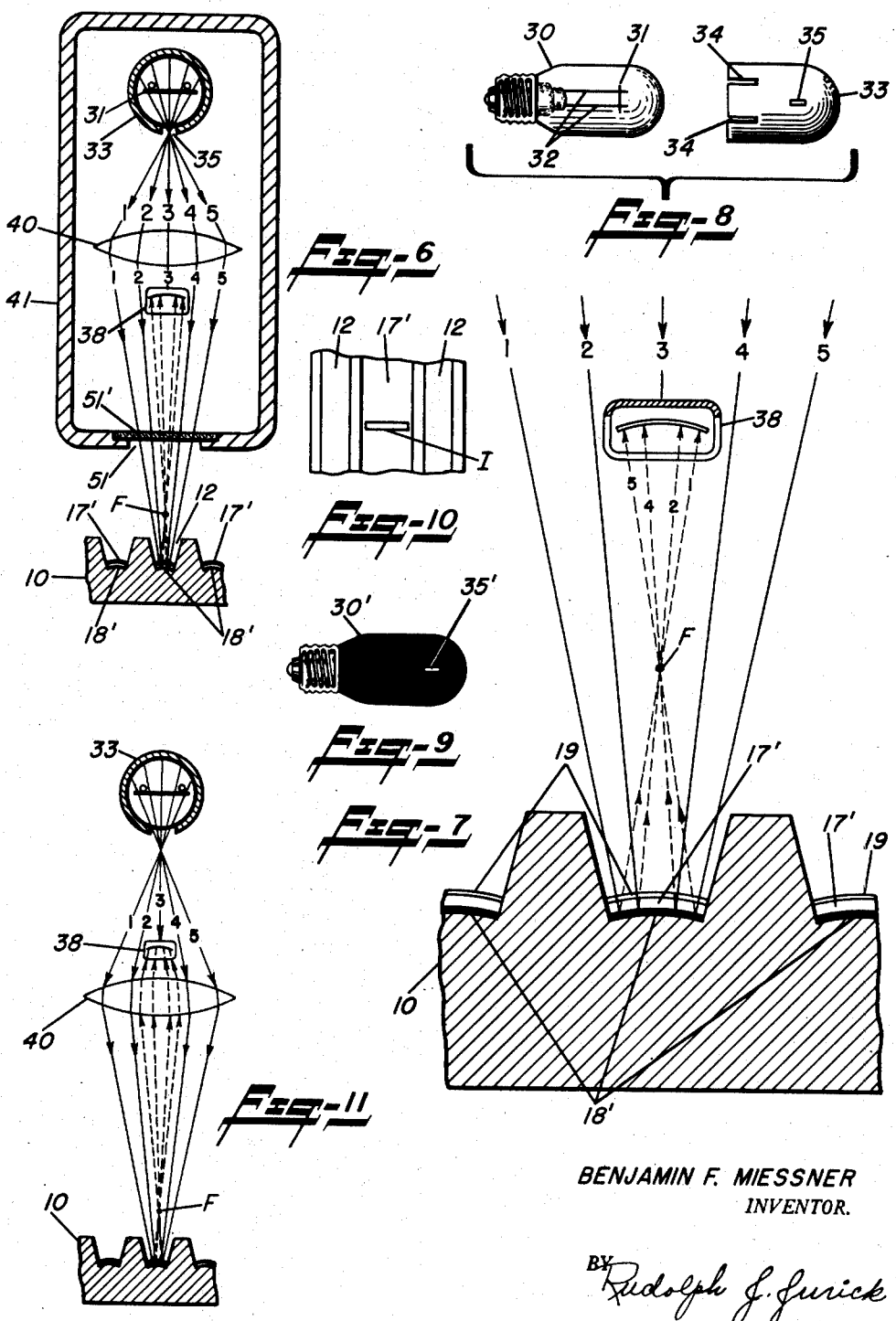

Patented Oct. 6, 1953

2,654,810

UNITED STATES PATENT OFFICE 2,654,810

PHOTOELECTRIC TRANSLATING SYSTEM

Benjamin F. Miessner, Harding Township, Morris County, N. J., assignor to Miessner Inventions Inc., Harding Township, Morris County, N. J., a corporation of New Jersey Application November 15, 1949, Serial No. 127,301

9 Claims. (Cl. 179—100.3)

This invention relates to translating apparatus and more particularly to a photoelectric system for reproducing photographically recorded sound or other types of recorded information.

In my copending patent application, Serial No. 122,100 filed October 18, 1949, I illustrate and describe several embodiments of a novel, photophonographic record and associated recording and reproducing apparatus. In general, the photophonographic system provides for long playing records of very high fidelity and exceptionally low noise, the latter being limited by the grain structure of the photographic emulsion forming the sound track. The general level of performance of a photo-phonographic system is in the class of variable-density sound-on-film systems which is much higher than that of conventional lateral or vertical-cut records. However, to translate the inherent, high quality of the photophonographic record into audio sounds of corresponding quality it is necessary to provide a reproducer which, itself, is entirely free of distortion-introducing factors. Such a reproducer is provided by the present invention.

While my invention will be described herein with specific reference to the reproduction of photographically recorded sound, it will be apparent the practical aspects of the invention are of much broader scope. The function of a photoelectric translating system is to provide electrical variations corresponding to a light beam that is modulated in accordance with a scanned area of the information to be translated, be the latter a sound track, a photograph, a photographic or printed page of reading matter, or etc. In these arrangements the light beam transmitted to the information to be translated is of constant intensity and modulations of the light beam as it strikes the light sensitive cathode of the photoelectric cell are produced by reflecting the light from the information bearing surface or element.

An object of this invention is the provision of a photoelectric translator in which the axis of a bundle of light rays emanating from a source of constant illumination is normal to the surface of the record to be translated.

An object of this invention is the provision of a photoelectric system for translating recorded information and in which the light source and the photoelectric cell are disposed in series arrangement on a common axis that is normal to surface of the information bearing element.

An object of this invention is the provision of a photoelectric translator comprising a light source, a lens and a photoelectric cell disposed coaxially with respect to each other and normal to the record to be translated.

An object of this invention is the provision of a reproducer comprising a light source, means restricting the effective light emanating from the light source to a minute beam of light rays, a lens for focusing the light rays at a predetermined point, and a photolectric cell, said light source, lens and photoelectric cell having a common axis.

An object of this invention is the provision of a reproducer comprising a housing, an aperture in the base of the housing, a lamp carried within the housing, an opaque shield around the lamp, an aperture in said shield, a photoelectric cell spaced from the lamp, and a lens, said photoelectric cell and lens being coaxially disposed with respect to the common axis of the apertures in the shield and housing base.

An object of this invention is the provision of photoelectric reproducing apparatus comprising an optical system in which the transmitted and reflected light beams have a common axis in combination with a photographically recorded sound track disposed over a non-planar reflecting surface.

These and other objects and advantages will become apparent from the following description when taken with the accompanying drawings which illustrate practical embodiments of the invention. The drawings are for purposes of description and should not be construed as defining the scope or limits of the invention, reference being had for this purpose to the appended claims.

In the drawings wherein like reference characters identify like parts in the several views:

Figure 1 is an isometric view of a record and reproducer arrangement of the type to which this invention relates;

Figure 2 is a fragmentary, cross-sectional view of the record disc and tracking stylus;

Figure 3 is a fragmentary view illustrating a photoelectric system for reproducing recordings from a photographic sound track;

Figure 4 is a fragmentary, cross-sectional view taken longitudinally of the record groove and illustrates the path of the light rays in the Figure 3 arrangement;

Figure 5 is a fragmentary, cross-sectional view taken transversely across the record groove and illustrates the path of the light rays in another arrangement of the light source and photoelectric cell;

Figure 6 is a cross-sectional view illustrating my novel arrangement of the light source, lens and photoelectric cell whereby the transmitted and reflected light beams have a common axis;

Figure 7 corresponds to Figure 6 and is a greatly enlarged view showing the path of the light rays from the lens to the record and from the record to the photoelectric cell;

Figure 8 is an elevation view illustrating the lamp and opaque shield as employed in the system shown in Figure 6;

Figure 9 shows a lamp having an opaque envelop provided with a narrow slit, which lamp may also be employed in the Figure 6 system;

Figure 10 is a plan view of a section of the record and shows the rectangular beam of light falling on the sound track; and Figure 11 is similar to Figure 6 but shows the photoelectric cell disposed between the source of light and the lens.

Figure 1 illustrates, in a general way, a record disc 10 disposed over a spindle 11 for rotation by the turntable of a phonograph. The sound track is disposed within a continuous, spiral groove 12 formed in the surface of the disc. Associated with the record disc is a tone-arm 13 pivotally supported by a post 14 said tone-arm carrying a head 15 which houses the operative elements of the sound reproducing system. A stylus or guide pin 16 is secured to the head 15 and is adapted to glide along the groove 12 causing the head to track with or scan the groove.

As shown in Figure 2, the spiral groove 12 is defined by sloping walls and the end of the guide pin 16 is shaped to conform thereto, as shown. It will be noted that the outside diameter of the guide pin exceeds the maximum width of the spiral groove whereby the end of the guide pin is spaced from the photographic sound track 17 that is disposed in the groove bottom. Consequently, the sound track is not subjected to wearing or scratching during actual operation of the phonograph, or in storing of the record disc, or in placing the reproducer upon the record manually or by automatic means. For purposes of describing the present invention the record disc 10 is made of any opaque material. The spiral groove may be formed by cutting, molding or pressing, depending upon the material used. In any event, the bottom of the groove must have a surface finish having a high coefficient of light reflection, said reflecting surface being indicated by the numeral 18. Various methods of providing such light reflecting surface on various opaque materials is described in detail in my co-pending patent application, identified above.

Figure 3, which includes a fragmentary cross-sectional view of the record disc 10, illustrates a photoelectric type of reproducer for reproducing the sound recorded on the photographic sound track. The sound track 17 is of the variable density type which is well-known in the sound-on-film art. The head 15 scans the sound track being guided by the stylus 16 as the disc 10 is rotated. Disposed within the head 15 is a light source 20, a condensing lens 21, an apertured plate 22, another lens 23 and a photoelectric cell 24. The light source is maintained at a constant intensity and the light rays emanating therefrom are focused upon the sound track 17, the light rays passing through an opening 25 in the base of the head 15. The light rays pass through the emulsion 17 and are reflected back as a diverging beam through the emulsion by the light reflecting surface 18 of the groove bottom, said reflected light rays passing through the opening 26 in the base of the head 15, through convex lens 23, and striking the photoelectric cell 24. It will be apparent the light striking the photoelectric cell is modulated in accordance with the density of the sound track and the modulated output of the photoelectric cell can be fed to an audio amplifier and associated loud speaker to reproduce audibly the recording carried by the photographic sound track. In the Figure 3 illustration the light beam striking the sound track is shown as a thin ribbon of light rays extending substantially across the entire width of the sound track but it is well-known the light beam may be a circular "pin-point" bundle of light rays.

In the Figure 3 arrangement the light source 20 and the photoelectric cell 24 are spaced apart longitudinally with respect to the sound track. Consequently, a finite angle is formed between the incident light rays passing through the sound track and the light rays reflected from the surface 18, as shown in Figure 4 wherein the incident rays and the reflected rays are identified by the letters $a$ and $b$, respectively. The angle X formed between the incident and reflected rays defines the active length of the sound track at any instant, that is, that portion of the sound track lying within the angle X is effective with respect to modulation of the light which strikes the photoelectric cell. While the angle X may be made small its minimum magnitude is limited by the physical spacing requirement of the lamp and photoelectric cell. It is apparent, therefore, that the length of sound track required to carry a given sound varies directly with the magnitude of the angle X. Conversely, the smaller the angle X, the longer will be the playing time per unit of length of the sound track. Thus, to obtain the maximum playing time on a record disc of given diameter the degree of divergence between the incident and reflected light rays should be as small as possible.

Figure 5 illustrates the path of the light beam when the light source and photoelectric cell are spaced apart laterally with respect to the spiral record groove. In this case the larger the angle X, the greater must be the width of the sound track. Consequently, the total number of convolutions of the spiral groove per radial inch of the disc is limited by the minimum effective width assignable to the sound track. Thus, the maximum playing time of the record is determined by the lateral spacing between the light source and the photoelectric cell.

From the above discussion it will be apparent that in any arrangement wherein the light source and the photoelectric cell are displaced from a plane normal to the surface of the sound track the incident light beam will strike the surface of the emulsion at an angle. Consequently, the incident light rays and the reflected light rays will pass through different sections of the emulsion.

In order to extend the playing time of the record to a maximum I provide a reproducer arrangement in which the unmodulated light rays striking the sound track and the modulated light rays reflected back through the emulsion have a common axis which is perpendicular to the emulsion surface. For this purpose the record groove should have a somewhat convex bottom which comprises the light reflecting surface on which the photographic emulsion is located.

For the moment reference is made to Figure 8 which illustrates a low voltage lamp 30 having a filament 31 secured to the supports 32 which also serve as lead wires for conducting current to the filament. The supports 32 are spring wires tending to move in opposite directions whereby the filament is kept taut. An opaque cap 33 is adapted to fit snugly over the glass envelop of the lamp, said cap being provided with longitudinal slots 34 to facilitate mounting of the cap upon the lamp and a minute slit 35 which serves as an aperture through which light rays may emerge from the lamp. The cap is mounted over the lamp and cemented thereto to prevent relative displacement. The inner surface of the cap 33 is made highly light reflecting as by chromium plating and polishing or by coating with a matt white paint. Its outside surface is blackened as by oxidation, paint or etc., to give the cap a good heat radiating characteristic. It will be apparent the cap is adjustable on the lamp as by sliding and turning. These adjustments, which are made prior to cementing of the cap to the lamp, permit proper alinement of the slit 35 with respect to the optical system. The sealed end of the lamp envelop at the screw base should likewise be coated internally with a light reflecting medium. Thus, when the lamp filament is energized the lamp and cap arrangement results in an intense source of light at the slit 35.

Figure 9 illustrates an alternate construction of the lamp, specifically, the exterior surface of the lamp envelop is coated with an opaque, heat conducting and radiating material such as paint, deposited metal or etc. The opaque coating has a slit 35' therein which serves as an opening for the passage of light. Similarly, the interior surface of the lamp envelop may be covered with an opaque coating that has good light diffusing and reflecting properties, said coating having therein a slit corresponding to and alined with the slit 35' in the exterior coating.

Due to the reflective character of the enclosure the lamp filament requires but a very low energizing current. Since the filament must be energized by a very steady current, or an unmodulated alternating current of a frequency sufficiently high to prevent audio frequency modulations of its emitted light, such low energizing power requirements are important.

It may here be pointed out that a lamp constructed as shown in Figure 8 is non-microphonic. Where an image of the incandescent filament is projected on the sound track, any vibration of the filament set up by mechanical shocks will set up modulations of the light illumination on the record which will cause spurious and undesired sounds in the reproducing system.

Reference is now made to Figures 6 and 7 which illustrate my novel optical system in which the transmitted and reflected light beams have a common axis. Since the light source must remain constant and since for normal home use power is derived from a 120 volt, 60 cycle supply, rectifying and filtering apparatus must be provided for energization of the lamp filament 31. Such apparatus is generally available in conjunction with radio and/or phonographs but for such current as the lamp filament may consume, say 50 milliamperes, additional filtering apparatus may be required. One simple solution of the problem is to energize the lamp filament from the combined ground return currents of the amplifying tubes with suitable provisions against "motor-boating," as is well-known in the radio art.

Light rays emanating from the filament 31 strike the inner light reflecting surface of the opaque cap 33 and are reflected outwardly through the slit 35. A lens 40, which preferably is optically "coated" on both sides to reduce reflected light losses, gathers the light emerging from the slit and focuses the light rays upon the emulsion sound track 17'' that is disposed in the bottom of the spiral groove 12 of the record disc 10. The groove width is so proportioned that the outer rays of the bundle of light fall within the side walls of the groove. The focusing lens 40 "sees" the interior, diffusely-reflecting surface of the cap 33 through the narrow slit 35, the latter positioned such that its long dimension is crosswise with respect to the record groove and its short dimension is parallel with respect to the groove, as illustrated in Figure 10. It will be apparent the short dimension determines the length of the sound track 17' which is illuminated by the projected image I of the slit 35, and this, in turn, controls the speed of travel of the record necessary for full translation of the sound track at a given, high audio frequency. The smaller this dimension, the lower the necessary speed of travel of the record, i. e., the lower the scanning speed, or, at a given speed the higher the frequency that may be picked up from the record.

I have designated by the numerals 1 to 5 bundles of light rays comprising the entire effective light beam of the optical system. These rays start at different points of the diffuse-reflector for the lamp, proceed to the lens where they are refracted and brought to a focus in the photographic emulsion. The rays pass through the emulsion to the slightly convex reflecting surface 18' of the groove bottom from which surface they are reflected back through the emulsion in a converging beam which comes to a focus at the point F, and then diverge to strike the cathode of the photoelectric cell 38. The numbered light ray bundles may be traced and their direction is indicated by the arrows. It will be noted that the ray bundle 3 is blocked by the rear surface of the photoelectric cell housing which may be blackened for this purpose. Since the convex reflecting surface 18' at the groove bottom is cylindrical in shape, there will appear only a distorted image of the slit 35 at the focal point F but this is unimportant since the illumination of the photoelectric cell cathode is the only significant factor, once the light beam has been reflected from the groove bottom.

Placement of the photoelectric cell at a point above the focal point F conserves light flux as the photoelectric cell blocks only a portion of the light transmitted through the lens. Since the cathode of the photoelectric cell has some finite area it is not necessary that the reflected light beam be brought to a sharp focus at the cathode unless the use of a very minute photoelectric cell is desired, such as, a crystal of CdS having an area of a few square mm. Such photoelectric cells may be used to conserve the light efficiency of the optical system and to permit the use of small cooperating elements.

The transmitted light rays that are blocked by the photoelectric cell contribute nothing to the illumination on the photographic sound track so that the light efficiency becomes primarily a matter of the ratio of the area of the cone of light rays transmitted by the lens to the area of those rays which are blocked by the rear surface of the photoelectric cell housing. Since both areas are proportional to the square of the respective radii, a photoelectric cell having, say, a diameter which is ¼ that of the lens will block out only 1/16 of the total light.

The photoelectric cell is enclosed within a suitable protective housing having a transparent front presented to the light rays that are reflected from the record. The cathode may be of rectangular or circular shape and the anode may be a wire, a light permeable grid or a small disc, in the path of the light rays, as is well-known in the art.

The lens may be of any suitable type such as convex, double convex, concavo-convex, etc. The optical distances between the lamp and the lens and between the lens and the emulsion, and the focal length of the lens, are so chosen that the image of the slit 35 is focused at the center of the emulsion depth. Preferably, the lens should have a short focal length to minimize the vertical dimensions of the apparatus.

The function of the slightly convex curvature of the groove bottom is to bring the light rays reflected therefrom to a converging focus. While reversing the direction of the light beam, the curvature of the groove bottom acts otherwise as a cylindrical, convex lens in bringing the diverging rays of the beam beyond the true focal point to provide an enlarged and imperfect image of the slit in the plane of the photoelectric cell cathode. The curvature of the groove bottom must, of course, be appropriately chosen for proper cooperation with the other elements of the optical system.

In cases where high light intensity is used it may be necessary to provide an appropriate heat ray filter or water cell to avoid overheating of the photographic emulsion. Also to protect the emulsion from moisture absorption it may be desirable to provide a thin, optically transparent coating 19 of non-hydroscopic varnish, lacquer, or etc. over the photographically recorded sound track.

The lamp, opaque cap (when used), lens and photoelectric cell are mounted rigidly within the housing or head 41 having a small opening 51 therein, it being noted that the light aperture or slit 35, lens 40 and photoelectric cell 38 lie on a common axis that is normal to the sound track 17'. The head 41 may be sealed against dust, moisture and vapors by closing the opening 51 with a glass or transparent plastic plate 51' having an opaque coating thereon except for a small rectangular area required to permit passage of the light beam therethrough, and the rectangular, clear area may be coated with an appropriate medium to reduce reflected light losses. Certain practical advantages accrue by reason of the dust and moisture tight housing construction. Dust and/or moisture will not collect on the internal optical elements and such matter which may accumulate on the external surface of the plate 51' can be wiped off without danger of forcing dust or lint into an otherwise open aperture. A rigid mounting of the parts within the housing 41 is essential to prevent relative movement thereof which would cause modulation of the slit image brightness, focal adjustment, or the light impinging upon the sound track; such effects resulting in modulations of the light falling upon the photoelectric cell and, consequently, spurious sounds in the reproducer. Preferably, the interior of the housing or pick-up head 41 is coated with black paint or other non-reflecting medium to prevent reflection of incident light.

Figure 11 illustrates a modification of the optical arrangement which may offer certain advantages particularly with respect to physical space requirements. It will be noted that the photoelectric cell 38 is disposed between the source of light and the lens 40 while still retaining the advantages of the coaxial arrangement as described hereinabove. In the Figure 11 arrangement both the transmitted and reflected light rays pass through the lens.

It will be understood from the above disclosures that a reproducing device can be made which has the same order of dimensions as that of conventional reproducers employing other, known principles of operation.

It may be remarked that, unlike the conventional sound-on-film apparatus, the herein described system may require a different type of emulsion or a somewhat different treatment in developing the recorded or printed records, since the light passes twice through the emulsion and, consequently, the density of the emulsion record need not be as great as with conventional sound films. Further, since the sound-on-film art, as currently practiced, requires a consideration of the picture as well as the sound content, insofar as concerns the photographic development treatment, it is obvious that records designed for use with my system can be treated as best suits their single purpose, namely, sound content.

While I have specifically described my light scanning and translating system with respect to the reproduction of a photographically recorded sound track, it will be apparent the invention has a much broader scope of application. The optical system may be used to record sound on a photographic record by modulating the light beam in accordance with electrical variations representing the instantaneous character of the sound being recorded. Also, the system is useful in reproducing, transcribing or translating any type of recorded information such as in picture telegraphy, facsimile apparatus, reading apparatus for the blind, etc. In any case, the light employed may include all or part of the visible spectrum, or merely infra-red or ultra-violet radiations. Such light may be formed into a rectangular bundle of light rays, as above described, or into a circular beam of light rays.

As shown in Figures 6, 7 and 11, the groove bottom and the emulsion forming the sound track are both of convex curvature. However, the application of the emulsion coating in such manner that the outer surface thereof will be flat (mono-planar) will not effect the operation of the system as herein described.

Having now described my invention in detail in accordance with the patent statutes, various modifications in the specific arrangement of the component parts will suggest themselves to those skilled in the art. Such modifications may be adopted without departing from the scope and spirit of the invention as recited in the following claims.

I claim:

1. In a photoelectric system for producing electrical variations in response to light rays reflected from a medium carrying recorded intelligence, the combination of a light source, a lens disposed between the light source and the medium and converting light rays from the source into a converging cone of light rays having an axis normal to the medium, said lens having a focal point beyond the medium whereby the cone of light rays reflected from the medium pass through a point of convergence above the medium; and a photoelectric cell disposed on the axis of the cone of light rays and having an active surface receiving only the reflected light rays which pass through the said point of convergence.

2. The invention as recited in claim 1 wherein the photocell is disposed between the lens and the said point of convergence.

3. The invention as recited in claim 1, wherein the photocell is disposed between the light source and the lens.

4. A photoelectric pick-up for sound translating apparatus comprising a housing having an aperture therein, a constant intensity light source within the housing, a lens converting light from the light source to a cone of light rays passing through the housing aperture, and a photoelectric cell disposed entirely within the cone of light rays emerging from the lens, said lens and photoelectric cell lying on a common axis that passes through the housing aperture.

5. A photoelectric pick-up for sound translating apparatus comprising a housing having an aperture therein, a constant intensity light source within the housing, a light shield surrounding the light source, an opening in the light shield, a lens converting light passing through the opening in the shield to a cone of light rays which pass through the housing aperture, and a photoelectric cell disposed within the said cone of light rays, said lens and photoelectric cell lying on a common axis that passes through the opening in the light shield and the housing aperture.

6. A photo-phonograph system comprising a record having a spiral groove in the surface; a light-permeable sound track disposed along the groove bottom, the surface of the sound track lying below the surface of the record; a pick-up head having an aperture in the base thereof; a tracking stylus secured to the head and adapted to glide along the outer edges of the groove walls, the end of said stylus being spaced from the surface of the sound track; a constant intensity light source in the pick-up head; a lens refracting light from the light source into a converging beam of light rays passing through the aperture in the pick-up head and through the light-permeable sound track; a reflecting surface underlying the sound track said surface reflecting the light rays back through the sound track, and a photoelectric cell within the pick-up head, said photoelectric cell being coaxially alined with the lens and receiving only the light rays that are reflected back through the sound track.

7. The invention as recited in claim 6, wherein the reflecting surface underlying the sound track is non-planar.

8. The invention as recited in claim 6, wherein the reflecting surface underlying the sound track is of convex form.

9. The invention as recited in claim 6 and including an opaque light shield surrounding the light source said shield having a minute aperture therein through which light rays pass from the light source to the lens.

BENJAMIN F. MIESSNER.

References Cited in the file of this patent

UNITED STATES PATENTS

| Number | Name | Date |
| --- | --- | --- |
| 1,760,866 | Belin | June 3, 1930 |
| 1,854,315 | Schmook | Apr. 19, 1932 |
| 1,884,285 | Schriever | Oct. 25, 1932 |
| 1,891,227 | Frielus | Dec. 20, 1932 |
| 1,916,973 | Frielus | July 4, 1933 |
| 1,917,003 | Williams | July 4, 1933 |
| 1,957,158 | Crudo | May 1, 1934 |
| 1,967,882 | Hammond | July 24, 1934 |